United States Patent
Dostal et al.

(10) Patent No.: US 7,431,872 B2
(45) Date of Patent: Oct. 7, 2008

(54) LOW-DENSITY CELLULAR WOOD PLASTIC COMPOSITE AND PROCESS FOR FORMATION

(75) Inventors: David F. Dostal, Cambridge, WI (US); Michael P. Wolcott, Moscow, ID (US)

(73) Assignee: Washington State University, Pullman, WA (US)

( * ) Notice: Subject to any disclaimer, the term of this patent is extended or adjusted under 35 U.S.C. 154(b) by 390 days.

(21) Appl. No.: 10/474,992

(22) PCT Filed: Apr. 26, 2002

(86) PCT No.: PCT/US02/13188

§ 371 (c)(1), (2), (4) Date: Mar. 18, 2004

(87) PCT Pub. No.: WO02/088233

PCT Pub. Date: Nov. 7, 2002

(65) Prior Publication Data

US 2004/0147625 A1    Jul. 29, 2004

Related U.S. Application Data

(60) Provisional application No. 60/286,848, filed on Apr. 26, 2001.

(51) Int. Cl.
    *B29C 44/34* (2006.01)
    *B29C 44/46* (2006.01)
(52) U.S. Cl. .................. 264/51; 264/50; 264/53
(58) Field of Classification Search ............... 521/84.1; 264/50, 53
See application file for complete search history.

(56) References Cited

U.S. PATENT DOCUMENTS

| | | | | | |
|---|---|---|---|---|---|
| 4,737,532 | A | * | 4/1988 | Fujita et al. | 524/13 |
| 5,474,722 | A | * | 12/1995 | Woodhams | 264/45.3 |
| 5,486,553 | A | * | 1/1996 | Deaner et al. | 524/13 |
| 5,516,472 | A | * | 5/1996 | Laver | 264/118 |
| 5,707,573 | A | * | 1/1998 | Biesenberger et al. | 264/50 |
| 5,847,016 | A | * | 12/1998 | Cope | 521/84.1 |
| 6,066,680 | A | * | 5/2000 | Cope | 521/79 |
| 6,280,667 | B1 | | 8/2001 | Koenig et al. | |
| 6,344,268 | B1 | * | 2/2002 | Stucky et al. | 428/317.9 |
| 6,409,952 | B1 | * | 6/2002 | Hacker et al. | 264/171.1 |
| 2002/0165289 | A1 | | 11/2002 | Park et al. | |

OTHER PUBLICATIONS

Koguchi, Takayoshi, et al., "Synthetic wood materials with improved night visibility" retrieved from STN, Database Accession No. 130:283130 CA, XP002207475 abstract, & JP 11080400 A (Sekisui Jushi Co., Ltd., Japan) Mar. 26, 1999.

(Continued)

*Primary Examiner*—Monica A Huson
(74) *Attorney, Agent, or Firm*—Charles S. Sara, Esq.; Dewitt Ross & Stevens S.C.

(57) ABSTRACT

A low-pressure $CO_2$ tank or an air compressor with a refrigerated air dryer is attached to the vent zone of a standard twin-screw extruder. During extrusion, the gas is dissolved in the wood-plastic melt. The $CO_2$ expands which foams the wood-plastic material.

14 Claims, 1 Drawing Sheet

OTHER PUBLICATIONS

Katsubu, Toraichi, "Manufacture of lightweight ethylene polymer foams" retrieved from STN, Database CA Online, Chemical Abstract Service, Columbus, Ohio, US, Database Accession No. 133:164949 CA, XP002207476, abstract, & JP 2000 225638 A (Asahi Chemical Industry Co., Ltd., Japan) Aug. 15, 2000.

Doroudiani, S., et al. "Structure and mechanical properties study of foamed wood fiber/polyethylene composites" retrieved from STN, Database CA Online, Chemical Abstract Service, Columbus, Ohio, US, Database Accession No. 127:66547 CA, XP002207477 & Annual Technical Conference—Society of Plastics Engineers (1997), 55th (vol. 2), 2046-2050, 1997.

* cited by examiner

LOW-DENSITY CELLULAR WOOD PLASTIC COMPOSITE AND PROCESS FOR FORMATION

CORRESPONDING APPLICATION

This patent application claims priority under 35 U.S.C. §119(e) to U.S. Provisional Patent Application Ser. No. 60/286,848, entitled "Extrusion of Low-Density Cellular Wood Plastic Composite Using Low Pressure Injection of Carbon Dioxide and Moisture Vapor From Wood as the Blowing Agent, filed Apr. 26, 2001, in the name of David F. Dostal and Michael P. Wolcott.

FEDERAL FUNDING STATEMENT

This invention was made with United States government support awarded by the Office of Naval Research, contract number: N00014-97-C-0395. The United States has certain rights in this invention.

FIELD OF THE INVENTION

The present invention is directed to an extruded cellular wood-plastic composite and a process for making the same. The present invention is specifically directed to an extruded wood-plastic composite of low density comprised of soft wood or hard wood flour and a thermoplastic resin produced by the introduction of carbon dioxide ($CO_2$) gas, nitrogen ($N_2$) gas, or air as physical blowing agents into the extrusion process at low pressure. The thermoplastic resin may be high-density polyethylene, polypropylene, or any other thermoplastic resin suitable for use in a wood-plastic composite. The wood plastic composite produced by this process may be in the form of homogeneous foam or a form in which a dense skin is formed around a cellular core.

DESCRIPTION OF THE PRIOR ART

The current state of the art in the extrusion of cellular wood plastic composites produces cellular wood plastic composites containing poly-vinyl chloride (PVC), acrylonitrile butadiene styrene (ABS), polypropylene (PP), or polystyrene (PS) as the plastic resin. Foaming is accomplished through the use of chemical blowing agents that add an appreciable amount to the cost of the product. Significant weight reduction of the extruded material must be accomplished by the use of these blowing agents to offset the increased cost. The foams so produced are usually allowed to expand outward upon exiting from the die. The extruded profile is then shaped and sized by methods known to those practiced in the art. In an alternative process, the composite may be extruded as a hollow profile and allowed to expand or foam inward. The profile is contained in an appropriate device to maintain the extruded shape in this alternate process.

Carbon dioxide has been successfully utilized as a physical blowing agent in the foaming of low-density micro-cellular plastics in an extrusion process (Park, B. et al., "Low density microcellular foam processing in extrusion using $CO_2$", *Polymer Engineering and Science*, p 1812, v.38, 1998). However, the process required injection of the blowing agent at high pressures, utilized high-impact polystyrene (HIPS) as the plastic resin, and did not involve a wood-plastic composite material. Extrusion processes using physical blowing agents, such as carbon dioxide, currently produce cellular plastic material made from high-density polyethylene (HDPE) and PP. However, the gas is introduced in high-pressure regions of the extruder and must be pumped into the extrusion at pressures between 1000 and 5000 psi.

Strength and stiffness of wood plastic composites decreases when they are foamed. This decrease is generally inversely proportional to the density of the foam. As a result, currently available elements such as deck boards are either of relatively high density (0.8-0.9 $g/cm^2$) or have a dense unfoamed, structural layer co-extruded on the outside of the foam. The co-extrusion process requires the use of a second extruder, which increases equipment costs.

SUMMARY OF THE INVENTION

The present invention is directed to a cellular wood plastic composite comprised of soft wood flour and high-density polyethylene wherein the ratio of wood flour to high-density polyethylene ranges from 1:4 to 3:2.

The present invention is also directed to a process for forming a stable cellular wood plastic composite of low density comprising: mixing finely ground wood flour with plastic in an extruder to form a plasticated mixture; introducing a blowing agent into the plasticated material under pressure sufficient to drive the blowing agent into the plasticated mixture to form cells within the plasticated mixture, wherein the blowing agent is introduced under a pressure gradient in the extruder sufficient to increase the solubility of the blowing agent in the plasticated mixture and under a temperature sufficient to prevent collapse of the cells; and reducing the pressure prior to removing the plasticated mixture from the extruder.

The introduction of the physical blowing agent in the vent region of an extruder allows the gas to be injected at low pressures using only a simple two-stage pressure regulator. No pump is required and no high-pressure piping is necessary.

In this process, mixing finely ground wood flour with the plastic enhances the foaming process. The number of cells per unit volume of the foam is increased and the density of the foam is decreased. The wood flour enhances the foaming process through two mechanisms with the first mechanism being the introduction of additional gases to the extrudate and the second being the altering of the viscosity of the extrudate. Residual moisture and other volatile gases are released from the wood during the extrusion process. These gases act as additional blowing agents. The wood flour also increases the viscosity of the extrudate. This allows the extrudate to be processed at higher melt pressures without these higher pressures causing back flow of the extrudate into the vent manifold of the extruder. The higher pressures allow the blowing agent to disperse throughout the resin more readily and more completely, resulting in improved cell structure and increased cell density.

The addition of wood flour decreases the cost of the material by displacing a more expensive ingredient (plastic resin) as well as increasing the stiffness of the foam. Therefore, an enhanced process to foam wood-plastic composites is accomplished.

One advantage of the present invention is that the expensive chemical blowing agent used in the prior art to produce a foamed wood-plastic composite is now replaced with a less-expensive physical blowing agent.

A second advantage is that a member may be produced with a dense outer layer and a foam core utilizing only one extruder. Additional advantages are the low cost method of introducing the blowing agent, the decreased cost of materials needed for production, and the increased stiffness of the product when compared to plastic foam.

The product may be used for decorative moldings inside or outside of a house, picture frames, furniture, porch decks, window molding, window components, door components, and roofing systems. Other types of use are contemplated.

Reference is now made in detail to the preferred embodiments of the invention, examples of which are illustrated in the accompanying drawing.

DESCRIPTION OF THE INVENTION

Figure 1:
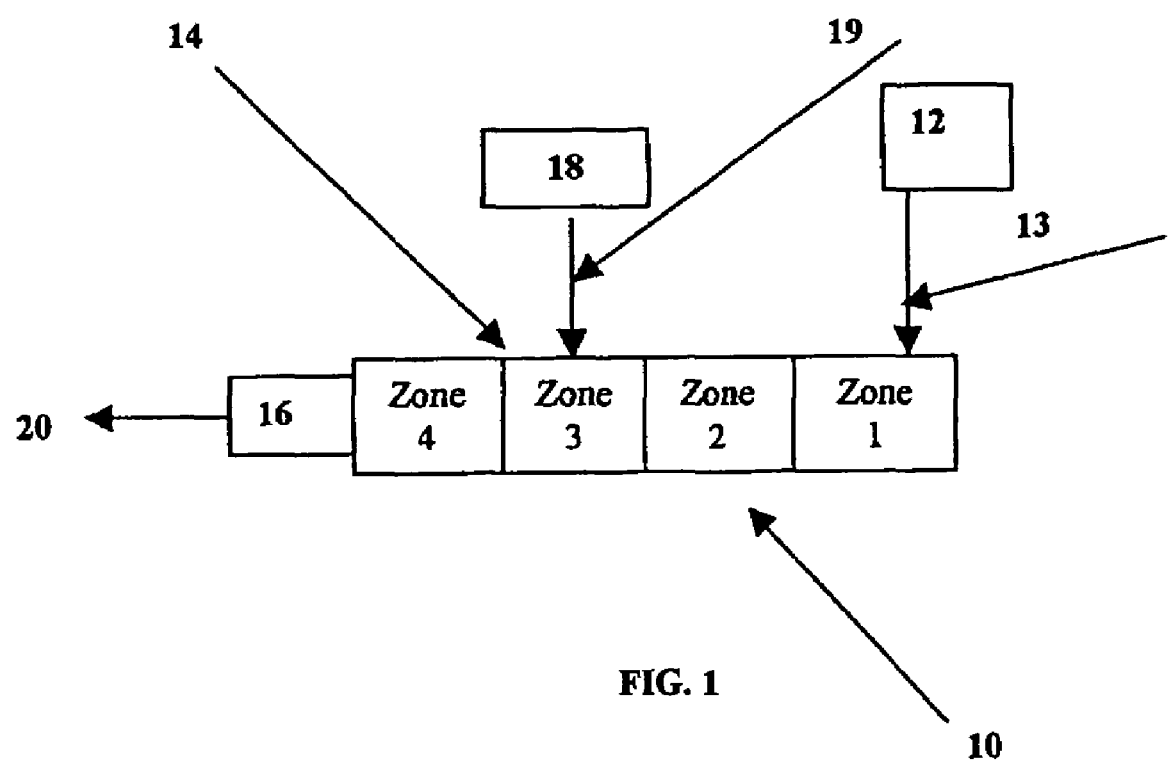
FIG. 1 is a flow chart illustrating the process of the invention.

Wood Flour:

Wood flour with a particle size of 40 mesh or smaller derived from either hard or soft wood species may be used. Preferably the particle size is 60 mesh or smaller. The moisture content of the wood flour may vary from less than 1% to 9%. Higher moisture content results in lower density foam but increases cell size and increases the presence of voids in the foam structure. Preferably foremost applications the wood is dried to 1% moisture content. Drying technologies are known to the art. A suitable example is a desiccant dryer manufactured by Premier Pneumatics, Inc. (Allentown, Pa.).

While wood flour is the preferred material for the present invention, it is within the scope of the present invention to use a variety of cellulosic materials from sawdust to pond sludge and newspapers. The cellulosic material may also be a raw material including old newspapers, alfalfa, wheat pulp, wood chips, wood flakes, wood fibers, ground wood, wood veneers, wood laminates, kenaf, paper, cardboard, straw, and other cellulosic fibrous materials.

Prior to being combined with the other starting materials, the cellulosic materials should be dried to moisture content between approximately 1% and 9%. Preferred moisture content is no more than 2%. Drying technologies are known to the art. A suitable example is a desiccant dryer manufactured by Premier Pneumatics, Inc. (Allentown, Pa.).

Thermoplastic Materials:

The thermoplastic materials serve primarily as a process fluidizer. Most types of thermoplastic materials may be used, examples of which include multi-layer films, virgin thermoplastics such as polyethylene, polypropylene, poly-vinyl chloride (PVC), low density polyethylene (LDPE), ethyl-vinyl acetate and waste plastic sawdust from other industries as well as other recyclable polymer materials.

Thermoplastic materials are essential to the process of the present invention. The developing cells in the mixture are formed in the thermoplastic portion of the material matrix. Preferred types of thermoplastic materials that may be used are HDPE and PP. The ratio of cellulosic fibers to the thermoplastic material is between approximately 3:2 and 1:4. Preferably the ratio between the cellulosic fibers to the thermoplastic material is approximately 2:3.

Extruder

Reference is made to U.S. Pat. No. 5,516,472 to Laver, which is incorporated herein by reference, for a description of a suitable extruder. An example is a Cincinnati Milacron E55 counter-rotating intermeshing twin-screw extruder with triple flights, which is used to produce the cellular material. It is possible to control the temperature of the extrudate by utilizing the temperature controllers for the four-barrel zones and the screws of the E55 twin-screw extruder. The openings in the vent manifold that normally hold the sight glasses are plugged by covering them with a high temperature gasket and a 0.5 inch thick aluminum plate. The piping running from the vent manifold to the extruder vacuum system is modified by the addition of a ball valve on the vacuum line and a coupler (for connection of the $CO_2$ bottle or compressed air line) onto the vent manifold bleeder valve assembly.

Blowing Agent

Blowing agents are added to decrease density by creating small bubbles or cells in the material. The venting section of the screws provides an area for introduction of the blowing agent under low pressure. Carbon dioxide or nitrogen from a standard 50 pound gas bottle or compressed air produced by a common air compressor and dried by passing through a refrigerated air dryer is injected into the extruder barrel using a two-stage regulator in the case of the bottled gases or a single stage regulator in the case of the compressed air.

Other Additives

Other additives, as described in U.S. Pat. No. 5,516,472 to Laver, can be included to achieve maximum commercialization of this product. Additives include cross-linking agents, lubricants, compatibilizers, and accelerators.

Operation

Referring now to FIG. 1, the basic principles of the present invention follow. FIG. 1 illustrates a twin-screw extruder 10, which is known to the art. The extruder provides many projections and grooves that knead the materials causing them to combine more completely. The extruder 10 includes a hopper 12 to receive and form a mixture of the wood flour and the thermoplastic material, the extruder body 14 for extruding the mixture; and a die 16 connected to the extruder.

Hopper: The mixing of the materials prior to loading the extruder 10 may be accomplished by any simple mixing device. No heat is required during mixing and only an even distribution of the various components is required. A drum tumbler may be used for small quantities or a larger batch-type mixer such as a ribbon blender known to the art may be used. A typical feed hopper 12 used in this process may be a gravity feed, starve feed or force-feed (also known as a "crammer") hopper, depending on the flow characteristics of the particular compound.

Extruder: The mixture of raw materials is then delivered to a heated extruder 14. The extruder 14 utilizes low temperature mixing and extruding. This is unique in that most plastic mixing processes require mixing at a plasticization temperature, which is quite high. The present mixing temperature is substantially lower, preferably around 340° F. (171° C.). The material passing through the mixing zone of the extruder creates a mass of homogenous material at a certain temperature, approximately 325° F. (163° C.)-350° F. (177° C.) depending upon the particular compound.

The present invention can be processed with any capacity extruder. A counter-rotating and intermeshing twin screw, high pressure, extruder manufactured by Cincinnati Milacron (CM-55-HP) may be used in the preferred embodiment.

Preferably, the process is accomplished by twin-screw extruders, which are heated to process temperatures sufficient to blend the product together into a homogenous mixture at low temperature.

The temperature of the extrudate is controlled at a level that is 5-15° F. (2.7-8.3° C.) above the crystallization temperature of the thermoplastic. This prevents collapse of the product formed as will be described further on.

The temperature of the extruder used in the present invention is controlled by the extrusion speed, external extruder heaters, shearing action and heaters in the die system and monitored by thermocouples (not shown) and other monitoring circuits. The purpose of the thermocouples is to monitor the heat at each station.

Flow Rate:

The flow rate of the extruder 14 is typically between about 100 and 2500 pounds per hour. In the preferred embodiment the flow rate is approximately 300 pounds per hour with a temperature at approximately 270° F. (132C)-325° F. (163° C.).

The product leaving the extruder is essentially unbounded round stock. Various sized extruder orifices are available with a range from 25 millimeters (mm) to 72 mm. In the preferred embodiment a 38 mm orifice is used.

As illustrated in FIG. 1, the extruder body 14 is segmented into four zones (zones 1, 2, 3 and 4). Zone 1 is the feed zone where the powdered or granular materials enter the flights of the screws from the hopper 12, via line 13. Heat applied from external sources and produced through shearing of the extrudate by the screws begins to melt the thermoplastic in this zone. In the preferred embodiment the temperature of this zone is maintained at 325° F. (163° C.). Zone 2 is the first metering zone. In this zone, a seal is formed between the extruder barrel and the screws, which restricts the transfer of pressures developed in the vent zone (zone 3) back to the feed zone (zone 1). The temperature of this zone in the preferred embodiment is 340° F. (171° C.). Zone 3 is the vent zone. Due to the isolation of this zone by the seal formed in zone 2, positive or negative pressure may be maintained in the vent zone. In the preferred embodiment the blowing agent is present in this zone at a positive pressure of 60 psi and the temperature is maintained at 325° F. (163° C.). Zone 4 is the second metering zone. The screw flights in this zone are designed to provide a pumping action that is capable of forcing the extrudate through the die at pressures of 600 psi-6000 psi. Blowing agent introduced in the vent zone is incorporated into the extrusion mass as a solute in zone 4. This zone also serves to cool the extrudate to a temperature suitable for production of cellular foam. In the preferred embodiment the temperature of zone 4 is maintained at 270° F. (132° C.). The temperature of the screws may also be controlled. In the preferred embodiment the screw temperature is maintained at 290-300° F. (143-149° C).

The gaseous form of the blowing agent, typically $CO_2$ or air, which is located at unit 18, is injected into the extruder via line 19 typically at zone 3 under pressures of 40 psi to 500 psi, preferably under 200 psi, in the vent region of the extruder. The blowing agent and volatile gases given off by the wood flour are mixed with the plasticated material in zone 4 of the extruder under pressures of 1400 psi to 3800 psi in order to drive them into solution. A pressure gradient is maintained in the extruder and die to increase the solubility of the blowing agent in the plastic. The temperature of the extrudate is controlled at a level that is 5-15° F. (2.7-8.3° C.) above the crystallization temperature of the thermoplastic. This prevents collapse of the cells formed when the blowing agent comes out of solution near the die exit. The pressure is released under a steep gradient, i.e., the pressure is reduced rapidly as the end of the die is approached and is completely released when the extrudate exits the die. The foam 20 is allowed to expand outward as it exits the die 16 producing a lightweight cellular product or alternatively is extruded as a hollow shape with the exterior being contained and cooled to produce a dense strong skin while the foam is allowed to expand into and fill the interior of the shape.

Die Configurations

Two die configurations are preferred for foam production.

1. The cellular material can be produced by foaming outward from a die of a size and length necessary for production of the required pressure drop. A die in the shape of a 3-inch by 0.5-inch slot with corner fillets 0.25 inch in radius was used. The length of the slot was 2.25 inches. Rigid foam with a density of 0.42 g/cm was produced from high-density polyethylene (HDPE) (Equistar LB 010000) using this configuration.

Cellular materials were then formed from composites containing HDPE and maple wood flour with the relative proportions being varied. Composites containing 20, 30, 40 and 50% wood by weight were successfully foamed. Foamed samples were selected at random from each category. Sample mass was measured on a digital electronic balance. Sample volume was determined by volume displacement of water. This method was used because of the irregular shape of a foam sample and the presence of voids in the material. The results are shown in Table 1. Production of low-density foams was possible with composites containing 20, 30, and 40% wood and medium density foam was produced with a composite containing 50% wood.

TABLE 1

Densities of Extruded Cellular Materials

| | Material | | | | | |
|---|---|---|---|---|---|---|
| | HDPE | 1% talc | 20% maple | 30% maple | 40% maple | 50% maple |
| sample density $g/cm^3$ | 0.44 | 0.44 | 0.26 | 0.22 | 0.22 | 0.53 |
| | 0.41 | 0.42 | 0.23 | 0.29 | 0.23 | 0.54 |
| | 0.39 | 0.40 | 0.25 | 0.25 | 0.24 | 0.48 |
| | 0.42 | 0.43 | 0.25 | 0.28 | 0.23 | 0.44 |
| | 0.46 | 0.48 | 0.25 | 0.27 | 0.24 | 0.44 |
| | 0.42 | 0.44 | 0.22 | 0.27 | | 0.46 |
| average density | 0.42 | 0.43 | 0.24 | 0.27 | 0.23 | 0.48 |

Subsequently a die was cut explicitly for the extrusion of wood plastic composite foam. The densities of the foams produced from composites containing 40% wood using this die are presented in Table 2.

TABLE 2

Densities of Cellular Materials Extruded with Differing Moisture Levels and Blowing Agent

| Wood Moisture Content (%)* | Blowing Agent | | Mean Density $(g/cm^2)$ | St. Dev. |
|---|---|---|---|---|
| 0.89% | None | | 0.954 | 0.043 |
| | $CO_2$ | 60 psi | 0.409 | 0.031 |
| | $CO_2$ | 100 psi | 0.488 | 0.023 |
| | $CO_2$ | 160 psi | 0.571 | 0.022 |
| | Air | 60 psi | 0.525 | 0.060 |
| | Air | 100 psi | 0.422 | 0.030 |
| 3.47% | None | | 0.616 | 0.126 |
| | $CO_2$ | 60 psi | 0.302 | 0.035 |
| | Air | 100 psi | 0.401 | 0.017 |
| 6.21% | None | | 0.325 | 0.021 |
| | $CO_2$ | 60 psi | 0.254 | 0.017 |
| | Air | 100 psi | 0.283 | 0.016 |
| 8.58% | None | | 0.323 | 0.019 |
| | $CO_2$ | 60 psi | 0.260 | 0.067 |
| | Air | 100 psi | 0.309 | 0.061 |

*Wood level is 40%

The data presented in Table 2 illustrate the synergistic effect of the added blowing agent and the volatile compounds present in the wood flour. Wood flour added to the composites in this trial was either undried or dried at one of three specific temperatures. As a result four different wood moisture levels were tested. These were 8.58% (undried), 6.21% (dried at 150° F.), 3.47% (dried at 235° F.), and 0.89% (dried at 325° F.). As seen in Table 2, the lowest foam densities are obtained when adding $CO_2$ as an additional blowing agent, followed by adding air as an additional blowing agent. The effect of injection pressure on foam density varies with blowing agent. Increasing injection pressure of air causes a decrease in density while increasing injection pressure of $CO_2$ causes an increase in foam density. Use of volatile compounds from the wood alone results in the highest foam densities. Foam density also is seen to decrease as the wood moisture level increases. This data indicates that low foam densities may be achieved through the process described here and that the addition of wood flour to the plastic resin enhances the foaming process.

2. The cellular material can be produced by extrusion of the wood plastic composite through a die designed to produce a hollow profile. This type of die typically has a mandrel that forms the interior of the hollow. This type of die may be of the type described in U.S. Pat. No. 5,516,472 to Laver. When this type of die is used, extruding the material through the stranding die develops the pressure needed for the incorporation of the blowing agent. The foam produced in this way can be allowed to expand freely or can be contained. If the foam is to be contained, a cooled calibrator whose inner surface matches the desired shape of the member is attached to the die so that the mandrel extends into the cavity of the calibrator. This results in the formation of a solidified skin on the exterior of the composite that has not been allowed to foam The interior of the profile is not yet solidified when the extrudate reaches the end of the mandrel. This material is allowed to foam into the interior of the profile creating a solid foam core surrounded by an unfoamed skin. The profiles produced in this manner may be made in intricate shapes. The skin thickness and profile dimensions can be designed so that a member suitable for use as a deck board may be produced.

Sample Embodiment 1

To investigate the properties of foam core composites that could be produced, laminates were made with outer flanges of high density wood-plastic composite material with a foam block melt bonded between them. Both the foam block and high-density flanges were heated on a platen of a hot press set at 170° C. for two minutes. The two heated surfaces were then pressed together for two minutes. Specimens were allowed to cool to room temperature overnight and were tested in flexure. Two types of specimens were made and tested. One type was made from foam containing 20% wood and the other from foam containing 30% wood. The flanges for both types were made from a formulation containing 58% wood, 31% HDPE, 8% talc, 2% zinc stearate, and 1% EBS wax.

The specimens made from 20% wood foam were broken in flexure on a mechanical type universal testing machine (United Model SFM-10, Huntington Beach, Calif.). An automated testing procedure was used which uses deflection control and halts the test when a reduction in load occurs. For the 20% wood foam samples, the test stopped when the bottom flange failed. No failure had occurred in the foam core this time.

The specimens were then rotated and tested with the other flange in tension. The results show a reduction in stiffness for the second test but no difference in strength. The 30% wood core foam specimens were broken in flexure on an Instron Model 4466 (Canton, Mass.) mechanical type universal testing machine. Failure of the foam core resulted simultaneously with failure of the bottom flange for the specimens. Twelve specimens were tested but four delaminated and data from those were not used. Mechanical properties of the 20% foam core laminates, the 20% foam core laminates broken from the second side, the 30% foam core laminates, and the control 2-box section are presented in Table 3.

TABLE 3

| | | Density (lb.ft-3) | Modulus (psi) | EI(lb-in$^2$) | Rupture (psi) | Strain at failure | Hyperbolic Modulus (psi) |
|---|---|---|---|---|---|---|---|
| Control | Average | 30.629 | 298686 | 233878 | 1570 | 0.010 | 321238 |
| 2-Box as | Standard deviation | 0.253 | 7184 | 2906 | 23 | 0.000 | 8829 |
| Solid Section | Coefficient of variation | 0.8% | 2.4% | 1.2% | 1.5% | 3.2% | 2.7% |
| 20% Wood Foam | Average | 37.032 | 216064 | 179768 | 1304 | 0.011 | 231503 |
| Laminate | Standard deviation | 0.765 | 17962 | 13940 | 136 | 0.002 | 21708 |
| | Coefficient of variation | 2.1% | 8.3% | 7.8% | 10.4% | 20.3% | 9.4% |
| 20% Wood Foam | Average | 37.032 | 154916 | 129661 | 1357 | 0.015 | 160396 |
| Laminate | Standard deviation | 0.765 | 18080 | 15581 | 58 | 0.000 | 20431 |
| Other Side | Coefficient of variation | 2.1% | 11.7% | 12.0% | 4.3% | 2.8% | 12.7% |
| 30% Wood Foam | Average | 36.987 | 255175 | 180068 | 1528 | 0.013 | 262407 |
| Laminate | Standard deviation | 1.887 | 33802 | 25113 | 147 | 0.001 | 35414 |
| | Coefficient of variation | 5.1% | 13.2% | 13.9% | 9.6% | 8.2% | 13.5% |

These values indicate that a laminate produced by co extrusion of high density wood-plastic composite with a cellular wood plastic core will perform in a manner similar to a hollow net section of the high density material when loaded in flexure. The foam core will add resistance to impact and buckling not present in the net section.

Members were produced by both extrusion and co-extrusion processes through the foaming process described above using die configuration 2 in which the profile is contained as it is cooled. The members produced by co-extrusion are referred to as laminated members in the following paragraphs. The flanges for the laminated members were made from a formulation containing 58% wood, 31% HDPE, 8% talc, 2% zinc stearate, and 1% EBS wax. The formulation of the foam core material was 60% HDPE and 40% wood fiber.

The same 60%-40% formulation was used in the production of cellular composite members produced by simple extrusion (without high density flanges).

A laminated member consisting of high-density wood-plastic composite flanges with a foam core was produced by co-extrusion of the two materials. The member was produced with a 2 inch wide by 6 inch deep cross section made up of a high density wood-plastic composite flange 2 inch wide by 0.9 inch deep on the top and bottom of the section with a 2 inch by 4.2 inch foam core between the two flanges. The foam core contained 40% wood fiber in this instance. Members with this profile were tested according to ASTM standard D6109 "Standard Test Methods for Flexural Properties of Unreinforced and Reinforced Plastic Lumber" test method "B", edgewise testing. Data from this test are presented in Table 4.

TABLE 4

Stiffness and Strength of Composite Joist Members

| Specimen # | Composite Density lbs/ft$^3$ | Composite I (in$^4$) | Composite MOE (psi) | Composite EI (lb-in$^2$) | Composite MOR (psi) |
|---|---|---|---|---|---|
| 1 | 39.60 | 33.07 | 399990 | 13227795 | 1484 |
| 2 | 39.69 | 33.07 | 353125 | 11677957 | 1326 |
| 3 | 41.03 | 33.07 | 376295 | 12444173 | 1360 |
| 4 | 38.96 | 33.07 | 359077 | 11874778 | 1281 |
| 5 | 40.12 | 33.07 | 386136 | 12769613 | 1332 |
| 6 | 40.30 | 33.07 | 388896 | 12860894 | 1324 |
| 7 | 39.25 | 33.07 | 372962 | 12333941 | 1245 |
| 8 | 40.38 | 33.07 | 386320 | 12775699 | 1308 |
| 9 | 40.38 | 33.07 | 387608 | 12818306 | 1321 |
| Average | 39.97 |  | 378934 | 12531462 | 1331 |
| STDEV | 0.6465501 |  | 15113.232 | 499798.8 | 66.1 |
| COV | 1.62% |  | 3.99% | 3.99% | 4.97% |

A laminated member was co-extruded with a profile 5.5 inch wide by 1.4 inch deep consisting of a high-density wood-plastic composite flange 5.5 inch wide by 0.2 inch deep on the top and bottom with a foam core 5.5 inch wide by 1.0 inch deep between the two flanges. The foam core again contained 40% wood fiber. This profile was tested according to ASTM standard D6109 test method "A", flatwise testing. This configuration simulates use as decking material. Results of this test are shown in Table 5.

TABLE 5

Stiffness and Strength of Composite Deck Members

| Specimen # | Composite Density lbs/ft$^3$ | Composite I (in$^4$) | Composite MOE (psi) | Composite EI (lb-in$^2$) | Composite MOR (psi) |
|---|---|---|---|---|---|
| 1 | 37.8 | 1.31 | 386979 | 505493 | 1793 |
| 2 | 39.7 | 1.21 | 333147 | 403909 | 1489 |
| 3 | 38.8 | 1.87 | 310653 | 579478 | 1424 |
| 4 | 42.2 | 1.22 | 362221 | 441411 | 1312 |
| 5 | 39.3 | 1.20 | 358992 | 431874 | 1660 |
| 6 | 37.7 | 1.32 | 385298 | 506917 | 1659 |
| 7 | 41.2 | 2.27 | 340056 | 771111 | 1692 |
| 8 | 40.8 | 2.15 | 366480 | 788590 | 1682 |
| 9 | 37.1 | 1.40 | 340098 | 476823 | 1800 |
| 10 | 36.4 | 1.92 | 277485 | 531545 | 1409 |
| Average | 39.1 | 1.6 | 346140.9 | 543715.2 | 1592.0 |
| STDEV | 1.9 | 0.4 | 33753.7 | 134540.4 | 170.5 |
| COV | 4.9% | 26.4% | 9.8% | 24.7% | 10.7% |

The data presented in Tables 4 and 5 show that the foaming process described above may be used in a co-extrusion process to produce a wood plastic composite member with properties suitable for some structural applications. Furthermore the composite density of this member is comparable to solid wood (20 to 45 lb/ft$^3$).

A member with a cross section 5.5 inch wide by 1 inch deep was produced by extrusion of cellular wood plastic composite through the process described above using die configuration 2. Use of this die configuration results in the formation of a dense skin on the surface of the profile. This skin adds strength and stiffness to the member. This profile was tested according to ASTM standard D6109, test method "A", flatwise testing. Results of this test are shown in Table 6.

TABLE 6

Stiffness and Strength of Cellular Composite Member

| Specimen No. | Density (lb · ft$^3$) | MOE (psi) | MOR (psi) |
|---|---|---|---|
| 1 | 31.7 | 133909 | 1421 |
| 2 | 28.3 | 125707 | 1357 |
| 3 | 33.6 | 178323 | 1585 |
| 4 | 34.2 | 160698 | 1667 |
| 5 | 28.4 | 157008 | 1325 |
| 6 | 27.3 | 127933 | 1271 |
| 7 | 32.4 | 164235 | 1723 |
| 8 | 31.3 | 182532 | 1728 |
| 9 | 28.1 | 120159 | 1220 |
| 10 | 29.8 | 136593 | 1536 |
| Average | 30.5 | 148709.7 | 1483.3 |
| STDEV | 2.5 | 22648.1 | 189.5 |
| COV | 8.1% | 15.2% | 12.8% |

Testing was done according to ASTM standard D790, "Standard Test Methods for Flexural Properties of Unreinforced and Reinforced Plastics and Electrical Insulating Materials." Results of this test are shown in Table 7.

TABLE 7

Flexural Properties of Decorative Molding

| Specimen no. | Density (lb · ft$^3$) | MOE (psi) | MOR (psi) |
|---|---|---|---|
| 1 | 38.2 | 204461 | 2266 |
| 2 | 38.0 | 215264 | 2204 |
| 3 | 38.0 | 222622 | 2273 |
| 4 | 36.8 | 205046 | 2057 |
| 5 | 37.6 | 216388 | 2145 |
| 6 | 37.5 | 218943 | 2171 |
| 7 | 37.6 | 179916 | 2217 |
| 8 | 39.3 | 187471 | 2316 |
| 9 | 37.0 | 188736 | 2182 |
| 10 | 37.9 | 190002 | 2158 |
| Average | 37.8 | 202885 | 2199 |
| STDEV | 0.7 | 15353 | 74 |
| COV | 1.8% | 7.6% | 3.4% |

Table 6 and 7 show that the low pressure foaming process may be used to produce members having a density within the range of natural solid wood that have sufficient material properties for use as building materials. Furthermore, the low-pressure foaming process may be used to produce intricate and decorative shapes with the outward appearance of finished natural wood.

It is understood that the invention is not confined to the particular construction and arrangement of parts herein illustrated and describe, but embraces such modified forms thereof as come within the scope of the following claims.

What is claimed is:

1. A process for simultaneously forming a stable cellular wood plastic composite, the composite having an outer layer and an inner layer wherein the inner layer density is lower than the outer layer density and wherein the composite is formed in an extruder, the extruder having a feeding zone 1, a first metering zone 2, a venting zone 3, and a second metering zone 4; the process comprising:

- a. mixing finely ground wood flour with a thermoplastic material at a temperature between about 325 and 350° F. (163 and 177° C.) in the feeding zone 1 to form a plasticated mixture;
- b. metering the plasticated mixture in the first metering zone 2 at a temperature of about 340° F. (171° C.);
- c. introducing a physical blowing agent into the plasticated mixture in the venting zone 3 at a pressure of between 40 psi and 500 psi and a temperature of about 325° F. (163° C.);
- d. metering the plasticated mixture of venting zone 3 in the second metering zone 4 at a pressure between about 600 and 6000 psi and a temperature of about 270° F. (132° C.) to drive the physical blowing agent into the plasticated mixture to form cells within the plasticated mixture, wherein the physical blowing agent is incorporated under a pressure gradient in the extruder sufficient to increase the solubility of the physical blowing agent in the plasticated mixture and under a temperature sufficient to prevent collapse of the cells; and
- e. reducing the pressure prior to removing the plasticated mixture from the extruder.

2. The process of claim 1, wherein in step d the temperature of the plasticated mixture in the second metering zone 4 is between 5 and 15° F. (2.7 and 8.3° C.) above its crystallization temperature.

3. The process of claim 1 wherein the physical blowing agent is introduced into the plasticated mixture in the venting zone 3 at a pressure of about 600 psi.

4. The process of claim 1 wherein the wood flour is selected from the group consisting of sawdust, pond sludge, newspapers, alfalfa, wheat pulp, wood chips, wood flakes, wood fibers, ground wood, wood veneers, wood laminates, kenaf, paper, cardboard, and straw.

5. The process of claim 1 wherein the wood flour is selected from hard and soft wood.

6. The process of claim 1 wherein the wood flour has a particle size no greater than about 40 mesh.

7. The process of claim 1 wherein the wood flour has a particle size no greater than about 60 mesh.

8. The process of claim 1 wherein the wood flour has a moisture content of between about 1% and 9%.

9. The process of claim 1 wherein the wood flour has a moisture content of no more than about 2%.

10. The process of claim 1 wherein the thermoplastic material is selected from the group consisting of polyethylene, polypropylene, poly-vinyl chloride, ethyl-vinyl acetate and waste plastic sawdust.

11. The process of claim 1 wherein the thermoplastic material is selected from the group consisting of high-density polyethylene, low-density polyethylene, and polypropylene.

12. The process of claim 1 wherein the thermoplastic material has a ratio of wood fibers to thermoplastic material of is between approximately 3:2 and 1:4.

13. The process of claim 12 wherein the ratio of wood fibers to the thermoplastic material is approximately 2:3.

14. The process of claim 1 wherein the physical blowing agent is dried, compressed air.

\* \* \* \* \*